United States Patent
Sasaki et al.

(10) Patent No.: US 11,308,806 B2
(45) Date of Patent: Apr. 19, 2022

(54) VEHICLE SURVEILLANCE SYSTEM AND VEHICLE SURVEILLANCE METHOD

(71) Applicant: TOYOTA JIDOSHA KABUSHIKI KAISHA, Toyota (JP)

(72) Inventors: Akira Sasaki, Miyoshi (JP); Jun Hioki, Nagakute (JP); Kazuki Matsumoto, Oogaki (JP); Fumio Wada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/935,689

(22) Filed: Jul. 22, 2020

(65) Prior Publication Data
US 2021/0027627 A1 Jan. 28, 2021

(30) Foreign Application Priority Data

Jul. 24, 2019 (JP) .............................. JP2019-136288

(51) Int. Cl.
*G08G 1/14* (2006.01)
*G06V 20/52* (2022.01)

(52) U.S. Cl.
CPC ............. *G08G 1/148* (2013.01); *G06V 20/52* (2022.01); *G08G 1/144* (2013.01)

(58) Field of Classification Search
CPC ..... G08G 1/148; G08G 1/144; G06K 9/00771
USPC ...................................................... 340/932.2
See application file for complete search history.

(56) References Cited

U.S. PATENT DOCUMENTS

| | | | | |
|---|---|---|---|---|
| 10,373,494 | B1* | 8/2019 | Krysiuk | H04W 64/006 |
| 2014/0213176 | A1* | 7/2014 | Mendelson | G01S 5/04 |
| | | | | 455/39 |
| 2015/0195518 | A1* | 7/2015 | Shikii | H04N 7/185 |
| | | | | 348/148 |
| 2016/0053699 | A1* | 2/2016 | Ozkan | G01N 33/004 |
| | | | | 701/112 |
| 2017/0096102 | A1* | 4/2017 | Nallapa | B60W 30/09 |
| 2018/0222470 | A1* | 8/2018 | Seo | G01S 15/931 |
| 2018/0312033 | A1* | 11/2018 | Chu | G01S 11/06 |
| 2018/0315317 | A1* | 11/2018 | Chen | G06Q 50/30 |

FOREIGN PATENT DOCUMENTS

| | | |
|---|---|---|
| JP | 2006-182234 A | 7/2006 |
| JP | 2009-006965 A | 1/2009 |

* cited by examiner

*Primary Examiner* — Kam Wan Ma
(74) *Attorney, Agent, or Firm* — Oliff PLC

(57) ABSTRACT

A vehicle surveillance system in which when a vehicle including a communication section that performs transmission-reception of radio communication is parked, information related to surveillance of the vehicle acquired at the vehicle is transmitted from the communication section through the radio communication, includes a control section that performs: acquiring information related to radio wave intensity received by the communication section; and, when the vehicle is intended to be parked, generating information related to a parking form that makes the radio wave intensity not lower than a predetermined intensity, based on the information related to the radio wave intensity received by the communication section.

10 Claims, 11 Drawing Sheets

| VEHICLE ID | TIME | IMAGE INFORMATION |
|---|---|---|
| V01 | T10 | S01 |
| V01 | T20 | S02 |
| V01 | T30 | S03 |
| V01 | T40 | S04 |
| V01 | T50 | S05 |
| ... | ... | ... |

| VEHICLE ID | TIME | RADIO WAVE INTENSITY | LOCATION | ORIENTATION | STATUS |
|---|---|---|---|---|---|
| V01 | T10 | R01 | L01 | D01 | 0 |
| V01 | T20 | R01 | L02 | D01 | 1 |
| V01 | T30 | R02 | L03 | D02 | 1 |
| V01 | T40 | R03 | L04 | D02 | 1 |
| V01 | T50 | R02 | L05 | D03 | 1 |
| ... | ... | ... | ... | ... | ... |

| VEHICLE ID | TIME | IMAGE INFORMATION |
|---|---|---|
| V01 | T10 | S01 |
| V01 | T20 | S02 |
| V01 | T30 | S03 |
| V01 | T40 | S04 |
| V01 | T50 | S05 |
| ... | ... | ... |

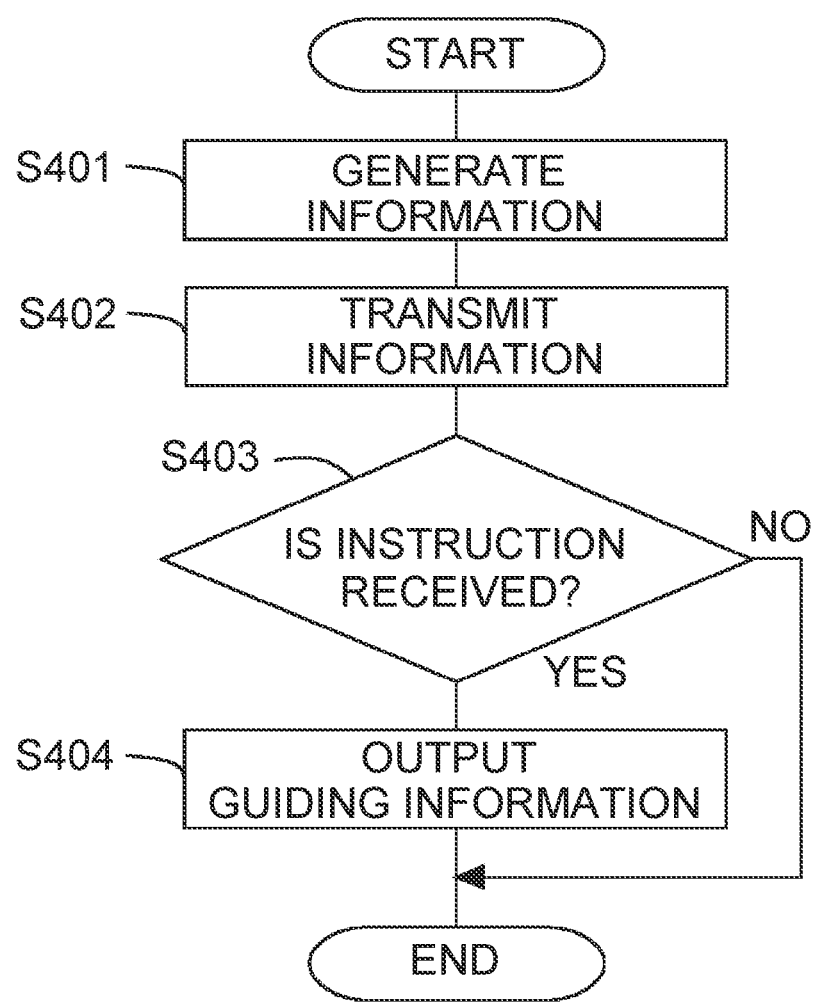

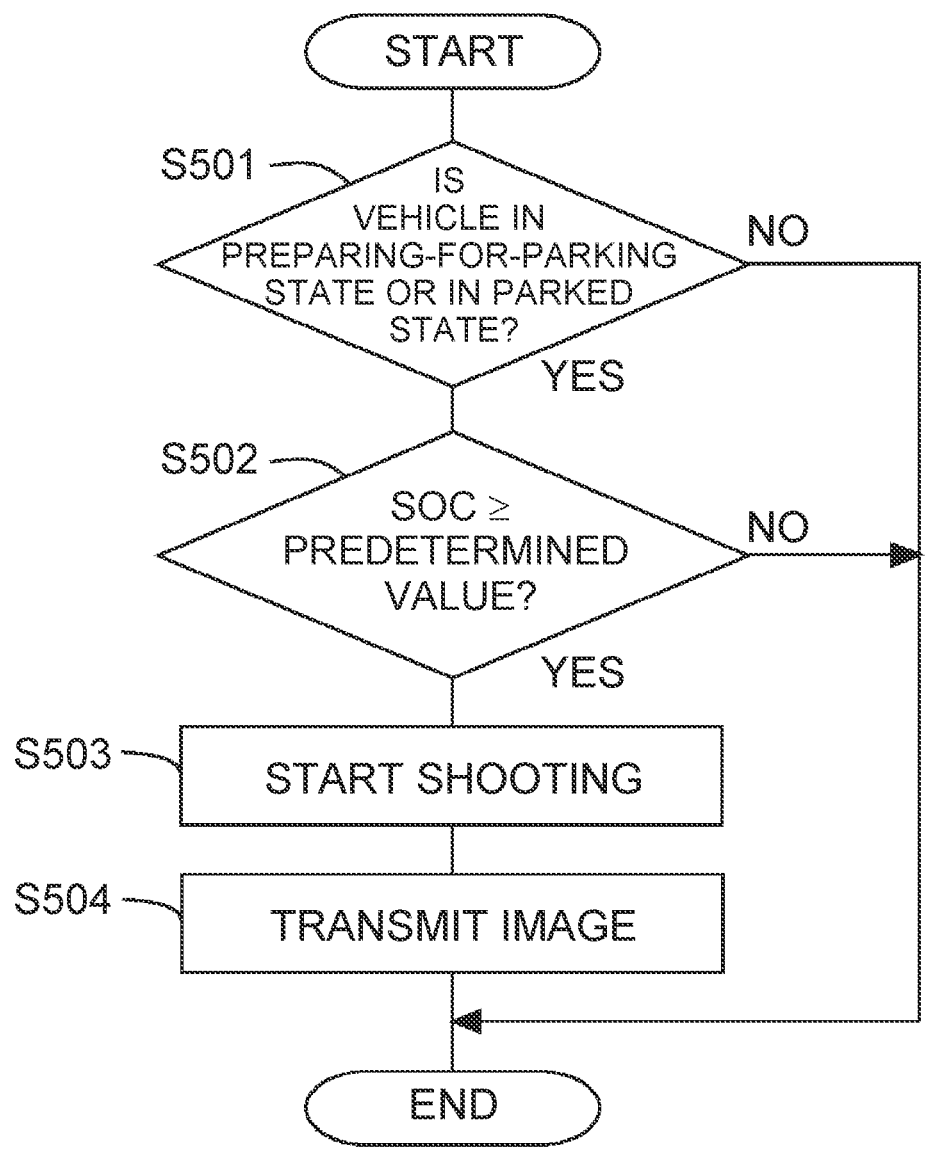

VEHICLE SURVEILLANCE SYSTEM AND VEHICLE SURVEILLANCE METHOD

INCORPORATION BY REFERENCE

The disclosure of Japanese Patent Application No. 2019-136288 filed on Jul. 24, 2019 including the specification, drawings and abstract is incorporated herein by reference in its entirety.

BACKGROUND

1. Technical Field

The disclosure relates to a vehicle surveillance system and a vehicle surveillance method.

2. Description of Related Art

A technique is known that uses a single camera as a camera for checking an area outside a vehicle that becomes a blind spot of a driver while the vehicle is used, and as a camera for surveilling a vehicle cabin while the vehicle is parked (for example, see Japanese Patent Application Publication No. 2009-006965).

SUMMARY

When a vehicle cabin and surroundings of a vehicle are surveilled by using a camera mounted on the vehicle while the vehicle is parked, it is conceivable that a user checks an image (a still image or a moving image) shot by the camera by using a terminal such as a smartphone. In such a case, the image is transmitted from the vehicle through radio communication, but it may take some time to transmit the image, depending on a communication environment, so that it can be difficult to check the image in real time. Accordingly, an object of the disclosure is to further enhance a communication rate of a parked vehicle.

An aspect of the disclosure is a vehicle surveillance system in which when a vehicle including a communication section that performs transmission-reception of radio communication is parked, information related to surveillance of the vehicle acquired at the vehicle is transmitted from the communication section through the radio communication, the vehicle surveillance system including a control section that performs: acquiring information related to radio wave intensity received by the communication section; and, when the vehicle is intended to be parked, generating information related to a parking form that makes the radio wave intensity not lower than a predetermined intensity, based on the information related to the radio wave intensity received by the communication section.

Another aspect of the disclosure is a vehicle surveillance method in which when a vehicle including a communication section that performs transmission-reception of radio communication is parked, information related to surveillance of the vehicle acquired at the vehicle is transmitted from the communication section through the radio communication, the vehicle surveillance method including: by a computer, acquiring information related to radio wave intensity received by the communication section; and, when the vehicle is intended to be parked, generating information related to a parking form that makes the radio wave intensity not lower than a predetermined intensity, based on the information related to the radio wave intensity received by the communication section.

Still another aspect of the disclosure is a program for causing a computer to execute the vehicle surveillance method, or a computer-readable storage medium storing the program in a non-transitory manner.

According to the disclosure, it is possible to further enhance a communication rate of a parked vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart showing a processing flow in the vehicle; and

FIG. 14 is a flowchart showing a processing flow of transmitting an image at the vehicle.

DETAILED DESCRIPTION OF EMBODIMENTS

Figure 1:
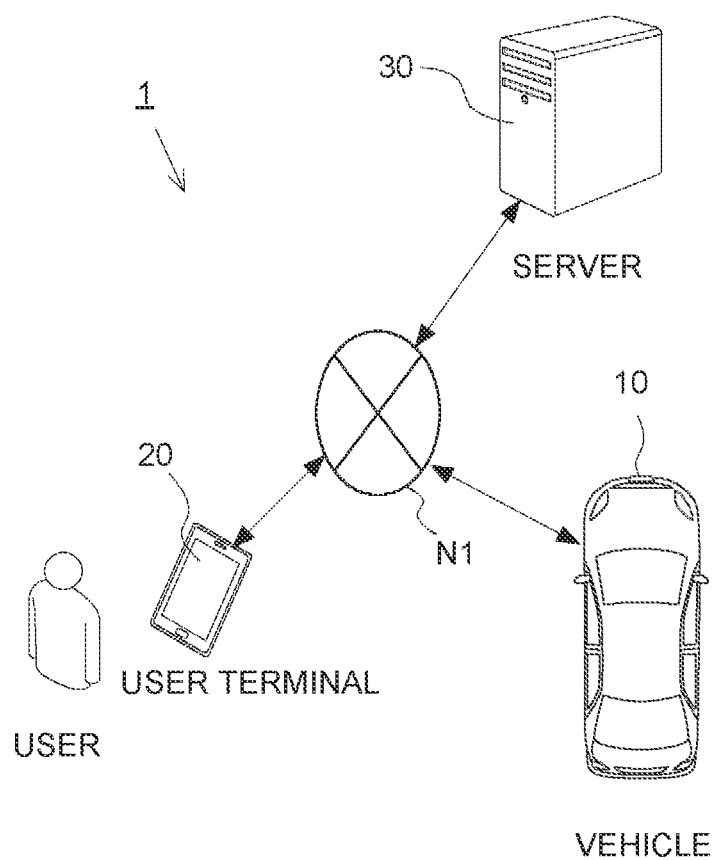
FIG. 1 shows a schematic configuration of a vehicle surveillance system according to an embodiment.

A vehicle surveillance system that is an aspect of the disclosure surveils a vehicle by using information related to surveillance of the vehicle acquired at the vehicle. The "information related to surveillance of the vehicle" includes, for example, information related to a state of the vehicle, information related to a state of surroundings of the vehicle, and information related to a state of a vehicle cabin. The information related to a state of the vehicle is, for example, information related to an opening-closing state of a door of the vehicle, a locked-unlocked state of a door lock of the vehicle, an operating state of a security system of the vehicle, and the like. The information related to a state of surroundings of the vehicle is, for example, information related to an image around the vehicle shot by a camera. The information related to a state of the vehicle cabin is, for example, information related to an image of the vehicle cabin shot by the camera. The information may be acquired by, for example, a sensor. The information may be transmitted to, for example, a server and a user terminal through radio communication.

"When the vehicle is parked" refers to, for example, when the vehicle is stopped and a user is not on board the vehicle. When the user is not on board the vehicle, the user can surveil the vehicle, based on information transmitted through radio communication. A communication section performs transmission-reception of the information related to surveillance of the vehicle and the like.

A control section acquires information related to radio wave intensity received by the communication section (hereinafter, also referred to as radio wave intensity information). The radio wave intensity information may be information obtained by actually measuring a radio wave intensity received, or may be information obtained by estimating a radio wave intensity based on, for example, a location of the vehicle, a direction of the vehicle, an image of surroundings of the vehicle shot by the camera, or the like. The radio wave intensity information may be information obtained by combining, with such information, information on a radio wave intensity actually measured at the same location in the past.

Here, when the information related to surveillance of the vehicle is transmitted from the vehicle, the greater the radio wave intensity is, the more quickly the information can be transmitted. For example, a moving image shot by the camera of the vehicle can be viewed in real time if a mobile communication service such as a 5th generation (5G) mobile communication scheme is used. However, for example, since 5G is highly directional, the radio wave intensity decreases when an obstacle or the like exists around, so that it can be difficult to view the moving image in real time. Accordingly, when the vehicle is intended to be parked, the control section generates information related to a parking form that makes the radio wave intensity not lower than a predetermined intensity, based on the information related to the radio wave intensity received by the communication section. The parking form is a form relevant to the radio wave intensity received by the vehicle, and may include, for example, a location at which the vehicle is to be parked or a direction in which the vehicle is to be parked. The predetermined intensity may be, for example, a radio wave intensity that is a lower limit value in an allowable range, or a requested radio wave intensity. The predetermined intensity may be a radio wave intensity at a current time point. In other words, the control section may generate information related to a parking form that makes the radio wave intensity not lower than a radio wave intensity at a current time point.

"When the vehicle is intended to be parked" refers to when it can be determined that the vehicle will be parked shortly afterward. For example, when a current location of the vehicle is in a parking area, it can be determined that the vehicle is intended to be parked. When the vehicle is intended to be parked, parking of the vehicle is performed based on the information generated by the control section, whereby the vehicle can be parked in the form that makes the radio wave intensity not lower than the predetermined intensity.

For example, when a plurality of parking stalls exist, the control section generates the information related to the parking form such that it can be determined in which stall the vehicle is to be parked. For example, when the radio wave intensity can vary depending on a direction of the vehicle even in the same parking stall, the information related to the parking form is generated such that it can be determined whether the vehicle is to be moved forward and parked, or is to be moved backward and parked. When the radio wave intensity can vary depending on a location in a parking stall even in the same stall, the information related to the parking form is generated such that it can be determined at which location in the parking stall the vehicle is to be parked.

The vehicle may be an electric vehicle. In a case of the electric vehicle, when a battery is charged, the vehicle needs to be parked for some time period. At the time, even when a user leaves the vehicle, a state of the vehicle can be surveilled by using, for example, a smartphone. The vehicle may be an autonomous vehicle. In a case of the autonomous vehicle, the vehicle may perform self-driving based on an instruction generated by the control section.

The control section may generate the information related to the parking form that makes the radio wave intensity not lower than the predetermined intensity, based on image data shot by the camera included in the vehicle.

For example, the radio wave intensity can decrease when a construction exists near the vehicle, or when a large sized vehicle is parked near the vehicle. In other words, the radio wave intensity can decrease when such an object that shields radio waves (hereinafter, also referred to as shielding object) exists around the vehicle. Accordingly, the control section may use, for the radio wave intensity information, image data acquired by the vehicle. For example, it is determined, based on the image data acquired by the vehicle, whether or not a shielding object exists, and when a shielding object exists, the information related to the parking form is generated such that the shielding object will be avoided. For example, when it can be determined, from the image, that a decrease in the radio wave intensity due to a shielding object cannot be ignored if the vehicle is moved any further in a parking stall, the information is generated such that the vehicle will be stopped and parked at a current location. For example, the information is generated such that the vehicle will be parked a predetermined distance away from the shielding object. In such manners, the radio wave intensity can be restrained from decreasing. Note that for the camera, a camera used for surveillance may be used, or the camera may be a camera for acquiring the radio wave intensity information.

A storage section may be further included that stores the information related to the parking form that makes the radio wave intensity not lower than the predetermined intensity in a predetermined area where the vehicle is allowed to be parked, and the control section may generate the information related to the parking form that makes the radio wave intensity not lower than the predetermined intensity, based on the image data shot by the camera and the information stored in the storage section.

For the predetermined area where the vehicle is allowed to be parked, an inside of a parking area where a plurality of vehicles can be parked can be cited as an example, or an inside of a single parking stall in a parking area can be cited as an example. When the vehicle travels within the predetermined area, the radio wave intensity actually received by the communication section can change. The information stored in the storage section is, for example, information previously acquired by another vehicle. The information may be, for example, information related to a radio wave intensity corresponding to a location of the vehicle or a direction of the vehicle in the predetermined area. The information may be, for example, image data shot in the predetermined area, or may be data on a construction or the like affecting the radio wave intensity in and around the predetermined area. Based on the information stored in the storage section, a parking form can be estimated that makes the radio wave intensity even greater in the predetermined area. However, even when the vehicle is parked in the same form as a previous form, it is conceivable that the radio wave intensity has changed because surrounding circumstances have changed from before. For example, the radio wave intensity can decrease when a new construction is built nearby, or when a large sized vehicle is parked nearby. In other words, when a shielding object that did not exist before exists around the vehicle, the radio wave intensity can become lower than before. Accordingly, the control section may generate the information related to the parking form, by using the image data acquired by the vehicle, in addition to the information stored in the storage section. For example, it is determined, based on the image data acquired by the vehicle, whether or not a shielding object exists, and when a shielding object exists, the information related to the parking form is generated such that the shielding object will be avoided. For example, when it can be determined, from the image, that a decrease in the radio wave intensity due to the shielding object cannot be ignored if the vehicle is moved any further within a parking stall, the information is generated such that the vehicle will be stopped and parked at a current location. For example, the information is generated such that the vehicle will be parked a predetermined distance away from the shielding object. In such manners, the radio wave intensity can be restrained from decreasing even when a state of radio waves has changed from before.

Moreover, when the radio wave intensity received by the communication section shows a tendency to decrease while the vehicle is moving in the predetermined area where the vehicle is allowed to be parked, the control section may generate the information related to the parking form that makes the radio wave intensity not lower than the predetermined intensity in a different direction from a moving direction of the vehicle.

The control section can generate the information related to the parking form, based on a radio wave intensity actually received. For example, when it can be determined, based on variations in the radio wave intensity over time, that the radio wave intensity shows a tendency to decrease, it is likely that the radio wave intensity will further decrease if the vehicle is moved further. In such a case, the radio wave intensity can increase if the vehicle is moved in a different direction from a moving direction of the vehicle at a current time point. Accordingly, the information related to the parking form may be generated such that the vehicle will not be moved any further in the moving direction of the vehicle at the current time point and parked. For example, the information may be generated such that the vehicle will be parked in a parking stall existing in a different direction from the moving direction of the vehicle at the current time point. Thus, the vehicle can be parked at a location where the radio wave intensity becomes greater. For example, the information may be generated such that the vehicle will be pointed in a different direction from the moving direction of the vehicle at the current time point and parked. Thus, the vehicle can be parked in a direction where the radio wave intensity becomes greater. For example, the information may be generated such that the vehicle will be parked at a current location. When the radio wave intensity shows a tendency to decrease, the radio wave intensity can be restrained from decreasing only by parking the vehicle at the current location. The information may be generated such that the vehicle will be parked at a location at which the radio wave intensity changes from a tendency to increase to a tendency to decrease while the vehicle is moving. Thus, the vehicle can be parked at a location where the radio wave intensity becomes greater. Note that "move" can include "move forward" and "move backward".

The control section may generate the information related to the parking form that makes the radio wave intensity not lower than the predetermined intensity, as information that a navigation system included in the vehicle provides to a user.

The navigation system provides the information related to the parking form to the user, whereby the user can park the vehicle in the form that makes the radio wave intensity not lower than the predetermined intensity. For example, the navigation system may display the parking form in a screen, or may show the parking form through voice navigation.

The control section may generate the information related to the parking form that makes the radio wave intensity not lower than the predetermined intensity, by being triggered by a current location of the vehicle entering an area related to a parking area.

The area related to a parking area may be, for example, an inside of a parking area, an entrance of a parking area, or a road leading to an entrance of a parking area. For example, when the current location of the vehicle is located at an entrance of a parking area, within a parking area, or on a road leading to an entrance of a parking area, it can be estimated that the vehicle will be parked shortly afterward. If generation of the information related to the parking form that makes the radio wave intensity not lower than the predetermined intensity is started at such a time, the information can be provided at an appropriate timing. Note that generation of the information may be triggered by the gear of the vehicle being shifted into reverse, in addition to the current location of the vehicle being in an area related to a parking area. The fact that the current location of the vehicle has entered an area related to a parking area may be determined, for example, from information indicating the current location of the vehicle and map information. For example, the fact that the current location of the vehicle has entered an area related to a parking area may be input by the user to a terminal. For example, information indicating that the current location of the vehicle enters an area related to a parking area may be acquired from an apparatus installed in the parking area.

Hereinafter, embodiments of the disclosure will be described based on the drawings. Configurations in the embodiments below are provided for an illustrative purpose, and the disclosure is not limited to the configurations in the embodiments. The embodiments can be combined to an extent possible.

First Embodiment

FIG. 1 shows a schematic configuration of a vehicle surveillance system 1 according to an embodiment. The vehicle surveillance system 1 shown in FIG. 1 includes a vehicle 10, a user terminal 20, and a server 30. The vehicle surveillance system 1 is a system that shoots surroundings of the vehicle 10 or an inside of the vehicle 10 by using, for example, a camera and causes the user terminal 20 to display a shot image. The vehicle surveillance system 1 is a system that guides a user, when the user parks the vehicle 10, to a location at which the radio wave intensity becomes not lower than the predetermined intensity, or into a direction in which the radio wave intensity becomes not lower than the predetermined intensity. A user in FIG. 1 is a user who operates the user terminal 20 and is, for example, a driver of the vehicle 10 or an owner of the vehicle 10.

The vehicle 10, the user terminal 20, and the server 30 are connected to each other through a network N1. The network N1 is, for example, a worldwide public communication network such as the Internet, and a WAN (Wide Area Network) or any other communication network may also be adopted. The network N1 may include a telecommunication network for mobile telephones or the like, or a wireless communication network of Wi-Fi (registered trademark) or the like. Although one vehicle 10 is shown in FIG. 1 for an illustrative purpose, a plurality of vehicles 10 can be present. Similarly to the vehicle 10, a plurality of user terminals 20 can be present. A plurality of user terminals 20 may interact with one vehicle 10. A plurality of vehicles 10 may interact with one user terminal 20.

Hardware Configuration

Figure 2:
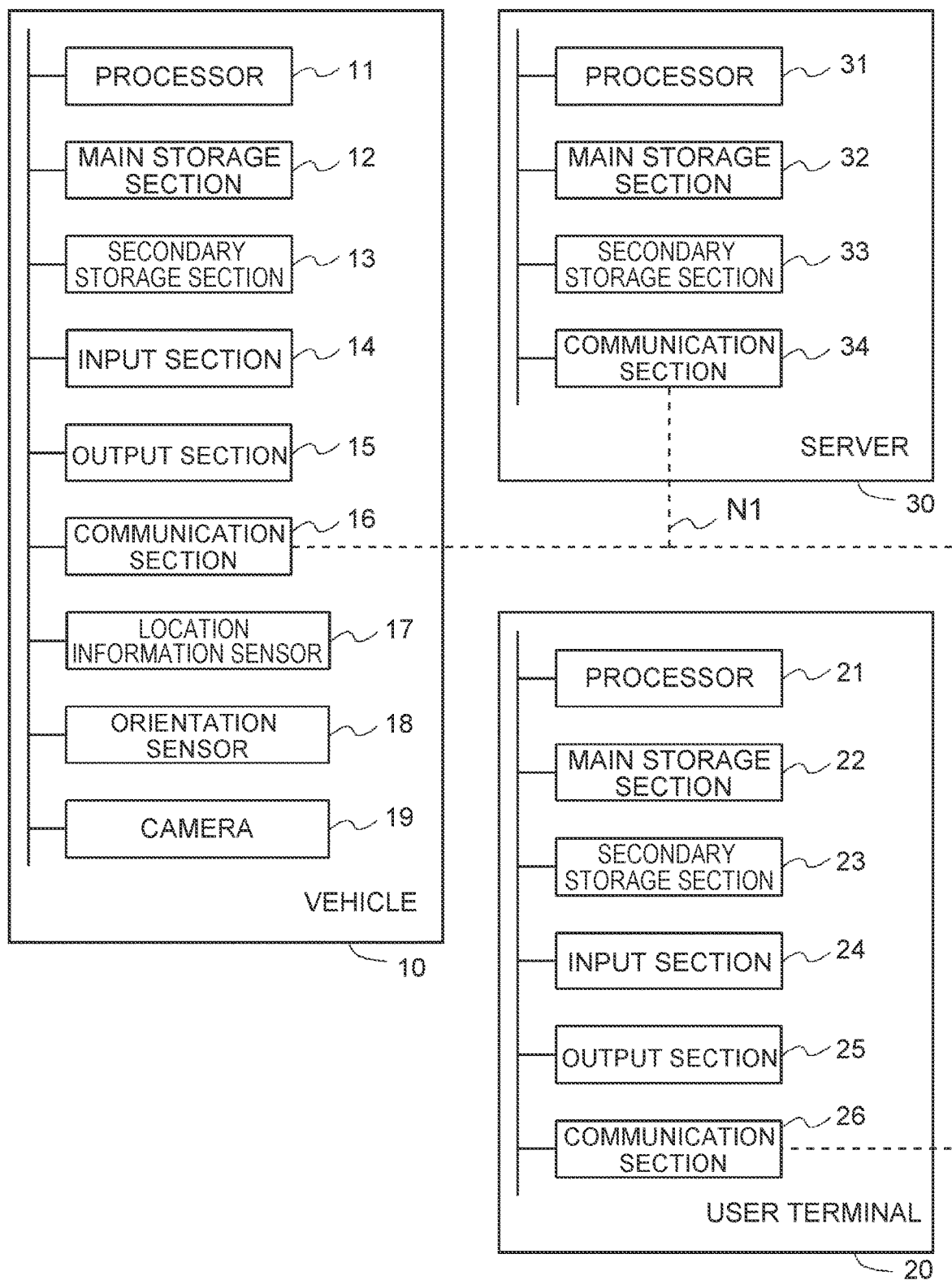
FIG. 2 is a block diagram schematically showing an example of respective configurations of a vehicle, a user terminal, and a server included in the vehicle surveillance system according to the embodiment.

Next, hardware configurations of the vehicle 10, the user terminal 20, and the server 30 will be described based on FIG. 2. FIG. 2 is a block diagram schematically showing an example of the respective configurations of the vehicle 10, the user terminal 20, and the server 30 included in the vehicle surveillance system 1 according to the embodiment.

The vehicle 10 includes a processor 11, a main storage section 12, a secondary storage section 13, an input section 14, an output section 15, a communication section 16, a location information sensor 17, an orientation sensor 18, and a camera 19. The sections and the like are connected to each other through a bus. The processor 11 is a CPU (Central Processing Unit), a DSP (Digital Signal Processor), or the like. The processor 11 performs computation for various information processing for controlling the vehicle 10.

The main storage section 12 is a RAM (Random Access Memory), a ROM (Read Only Memory), or the like. The secondary storage section 13 is an EPROM (Erasable Programmable ROM), a hard disk drive (HDD), a removable medium, or the like. The secondary storage section 13 stores an operating system (OS), various programs, various tables, and the like. The processor 11 loads and executes a program stored in the secondary storage section 13 on a work area of the main storage section 12, and each component section or the like is controlled through the execution of the program. The main storage section 12 and the secondary storage section 13 are computer-readable recording media. The configuration shown in FIG. 2 may be made in such a manner that a plurality of computers cooperate with each other. Information stored in the secondary storage section 13 may be stored in the main storage section 12. Information stored in the main storage section 12 may be stored in the secondary storage section 13.

The input section 14 is means for receiving an input operation made by the user and is, for example, a touch panel, a keyboard, a mouse, a push button, or the like. The output section 15 is means for presenting information to the user and is, for example, an LCD (Liquid Crystal Display), an EL (Electroluminescence) panel, a speaker, a lamp, or the like. The input section 14 and the output section 15 may be configured as a single touch panel display. The communication section 16 is a communicator for connecting the vehicle 10 to the network N1. The communication section 16 is, for example, a circuit for performing communication with another apparatus (for example, the server 30, the user terminal 20, or the like) through the network N1 by using a mobile communication service (for example, a telecommunication network of 5G (5th Generation), 4G (4th Generation), 3G (3rd Generation), LTE (Long Term Evolution), or the like), or a wireless communication network of Wi-Fi (registered trademark) or the like. The communication section 16 includes an antenna for radio communication.

The location information sensor 17 acquires location information (for example, a latitude, a longitude) on the vehicle 10 at a predetermined cycle. The location information sensor 17 is, for example, a GPS (Global Positioning System) reception section, a wireless LAN communication section, or the like. For example, the information acquired by the location information sensor 17 is recorded in the secondary storage section 13 or the like and transmitted to the server 30. The orientation sensor 18 acquires an orientation of the vehicle 10 at a predetermined cycle. The orientation sensor 18 includes, for example, a magnetic field sensor, a gyro sensor, or the like. For example, the information acquired by the orientation sensor 18 is recorded in the secondary storage section 13 or the like and transmitted to the server 30.

The camera 19 picks up an image by using, for example, an imaging device such as a CCD (Charge Coupled Device) image sensor or a CMOS (Complementary Metal Oxide Semiconductor) image sensor. The camera 19 is installed such as to acquire an image of an inside (a vehicle cabin) of the vehicle 10 or an outside (surroundings) of the vehicle 10. The image may be any of a still image and a moving image.

Note that a series of the processing performed in the vehicle 10 can be performed by hardware, but can also be performed by software. The hardware configuration of the vehicle 10 is not limited to the configuration shown in FIG. 2.

Next, the user terminal 20 will be described. The user terminal 20 is, for example, a small sized computer such as a smartphone, a mobile telephone, a tablet terminal, a personal information terminal, a wearable computer (a smart watch or the like), or a personal computer (PC). The user terminal 20 includes a processor 21, a main storage section 22, a secondary storage section 23, an input section 24, an output section 25, and a communication section 26. The sections and the like are connected to each other through a bus. The processor 21, the main storage section 22, the secondary storage section 23, the input section 24, the output section 25, and the communication section 26 of the user terminal 20 are similar to the processor 11, the main storage section 12, the secondary storage section 13, the input section 14, the output section 15, and the communication section 16 of the vehicle 10, respectively, and therefore a description thereof will be omitted.

Next, the server 30 will be described. The server 30 includes a processor 31, a main storage section 32, a secondary storage section 33, and a communication section 34. The sections and the like are connected to each other through a bus. The processor 31, the main storage section 32, the secondary storage section 33, and the communication section 34 of the server 30 are similar to the processor 11, the main storage section 12, the secondary storage section 13, and the communication section 16 of the vehicle 10, respectively, and therefore a description thereof will be omitted. The processor 31 is an example of the "control section".

Functional Configuration: Vehicle

Figure 3:
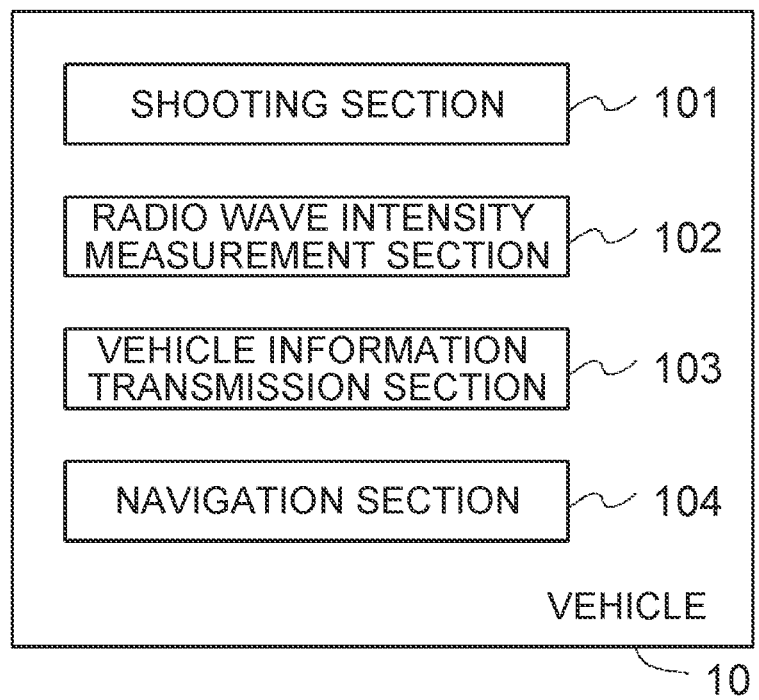
FIG. 3 shows an example of a functional configuration of the vehicle.

FIG. 3 shows an example of a functional configuration of the vehicle 10. The vehicle 10 includes, as functional components, a shooting section 101, a radio wave intensity measurement section 102, a vehicle information transmission section 103, and a navigation section 104. The shooting section 101, the radio wave intensity measurement section 102, the vehicle information transmission section 103, and the navigation section 104 are, for example, functional components provided in such a manner that the processor 11 of the vehicle 10 executes the various programs stored in the secondary storage section 13.

The shooting section 101 acquires image information by using the camera 19 and transmits the image information to the server 30 via the communication section 16. For example, the shooting section 101 shoots surroundings or the vehicle cabin of the vehicle 10 by using the camera 19 when the vehicle 10 is parked. The shooting section 101 therefore may determine whether or not the vehicle 10 is parked. For example, the shooting section 101 determines that the vehicle 10 is parked when the vehicle 10 is stopped and the user is not present in the vehicle cabin. It may be determined that the vehicle 10 is stopped, for example, when speed of the vehicle 10 is zero, or when a location of the vehicle 10 does not change. It may be determined that the user is not present in the vehicle cabin, for example, when communication cannot be performed with a key of a smart key system, or when radio wave intensity from the key is not higher than a predetermined value. The key may be held by the user separately, or may be included in the user terminal 20.

The shooting section 101 can acquire the image information by using the camera 19 also in another occasion than when the vehicle 10 is parked (for example, while the vehicle 10 is traveling). For example, the image information may be acquired by using the camera 19 when the vehicle 10 falls in a preparing-for-parking state. The preparing-for-parking state indicates that the vehicle 10 enters a stage prior to being parked, and it can be determined that the vehicle 10 falls in the preparing-for-parking state, for example, when a current location of the vehicle 10 acquired by the location information sensor 17 enters an area indicating a parking area on a map, or enters an entrance of a parking area on the map, or enters a road leading to a parking area on the map. It may be determined that the vehicle 10 falls in the preparing-for-parking state, for example, when the current location of the vehicle 10 acquired by the location information sensor 17 is in a parking area on the map and gear is shifted into reverse. When parking of the vehicle 10 is completed, it may be determined that the vehicle 10 is not in the preparing-for-parking state. The shooting section 101 determines that parking of the vehicle 10 is completed, for example, when the driver gets out of the vehicle 10. For example, in a case of the vehicle 10 adopting the smart key system, it can be determined whether or not the driver gets out of the vehicle 10, based on an intensity of a signal from the key. The shooting section 101 may acquire the image information by using the camera 19 in response to a request from the server 30, or may acquire the image information by using the camera 19 with predetermined frequency, or may constantly acquire the image information by using the camera 19. The shooting section 101 transmits the image information associated with identification information (vehicle ID) for identifying the own vehicle to the server 30.

The radio wave intensity measurement section 102 measures a radio wave intensity of a signal received by the communication section 16. For the measurement, a known circuit and a known calculation formula can be used. The radio wave intensity measurement section 102 measures a radio wave intensity at least when the vehicle 10 falls in the preparing-for-parking state. The radio wave intensity measurement section 102 therefore may determine whether or not the vehicle 10 falls in the preparing-for-parking state. Note that the radio wave intensity measurement section 102 may measure a radio wave intensity with predetermined frequency, may constantly measure a radio wave intensity, or may measure a radio wave intensity in response to a request from the server 30, regardless of whether or not the vehicle 10 is in the preparing-for-parking state. The radio wave intensity information is passed to the vehicle information transmission section 103.

The vehicle information transmission section 103 transmits the radio wave intensity information acquired from the radio wave intensity measurement section 102, the location information acquired from the location information sensor 17, and the orientation information acquired from the orientation sensor 18 to the server 30 via the communication section 16. Note that in the following, the radio wave intensity information, the location information, and the orientation information will also be referred to as vehicle information collectively. A timing at which the vehicle information transmission section 103 transmits the vehicle information can be set as appropriate, and for example, the vehicle information may be transmitted periodically, or may be transmitted at the same timing of transmitting some information to the server 30, or may be transmitted in response to a request from the server 30. The vehicle information transmission section 103 transmits the vehicle information associated with the identification information (vehicle ID) for identifying the own vehicle to the server 30.

The navigation section 104 shows a traveling route to the user via the output section 15. The traveling route can be generated by the navigation section 104, or can be generated by the server 30. The navigation section 104 shows a form (for example, a location or a direction of the vehicle 10) taken when the vehicle 10 is to be parked, to the user via the output section 15. The navigation section 104 shows such guiding information, based on an instruction received from the server 30.

Functional Configuration: User Terminal

Figure 4:
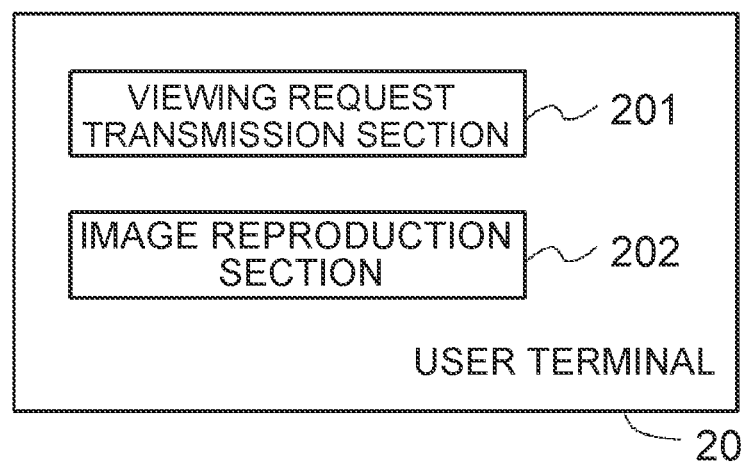
FIG. 4 shows an example of a functional configuration of the user terminal.

FIG. 4 shows an example of a functional configuration of the user terminal 20. The user terminal 20 includes, as functional components, a viewing request transmission section 201 and an image reproduction section 202. The viewing request transmission section 201 and the image reproduction section 202 are, for example, functional components provided in such a manner that the processor 21 of the user terminal 20 executes the various programs stored in the secondary storage section 23.

The viewing request transmission section 201 transmits a viewing request to the server 30. The viewing request is information for the user to request viewing of an image shot at the parked vehicle 10. For example, the viewing request transmission section 201 outputs an icon or the like for making a request to view an image capturing surroundings or the vehicle cabin of the vehicle 10 to the touch panel display of the user terminal 20 and, when the user clicks on the icon, generates a viewing request. The viewing request transmission section 201 transmits the generated viewing request associated with identification information (user ID) for identifying the user to the server 30. The user ID is input by the user via the input section 24 beforehand and stored in the secondary storage section 23.

The image reproduction section 202 acquires image information transmitted from the server 30 via the communication section 26, and shows an acquired image to the user by causing the output section 25 to display the acquired image.

Functional Configuration: Server

Figures 5, 6:
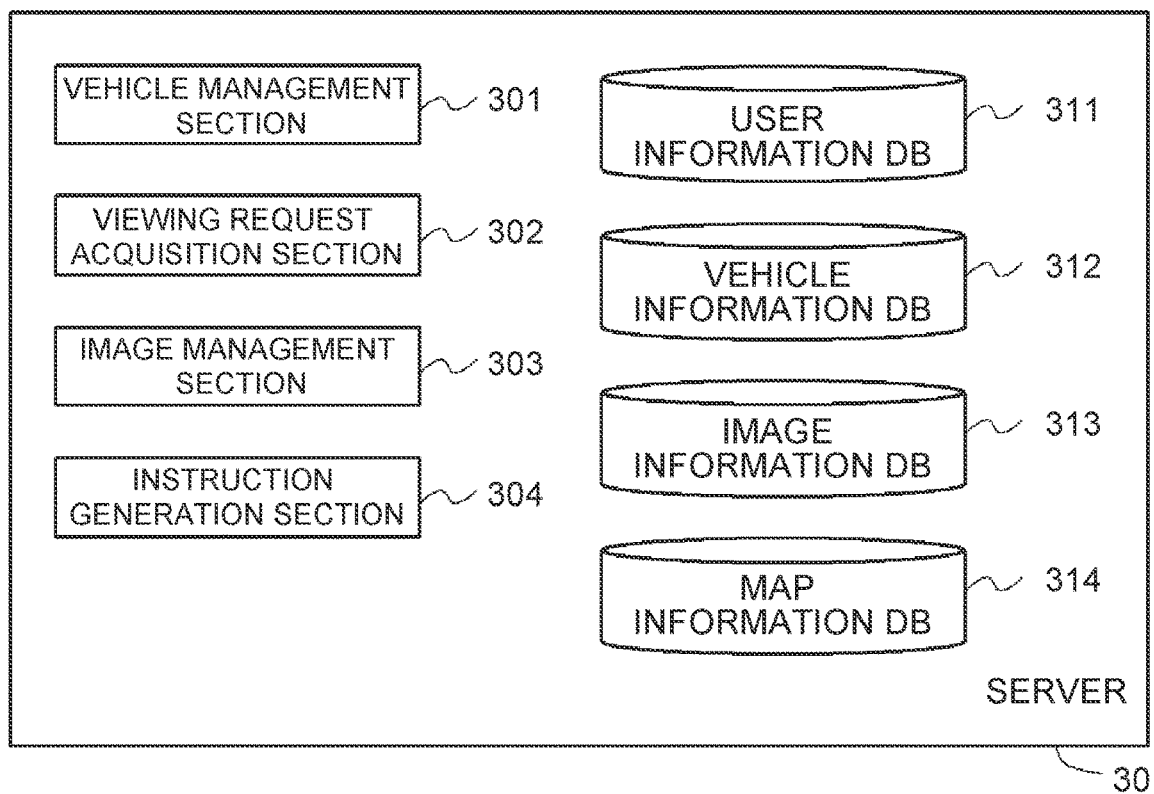
FIG. 5 shows an example of a functional configuration of the server.
FIG. 6 illustrates a table structure of vehicle information.

FIG. 5 shows an example of a functional configuration of the server 30. The server 30 includes, as functional components, a vehicle management section 301, a viewing request acquisition section 302, an image management section 303, an instruction generation section 304, a user information DB 311, a vehicle information DB 312, an image information DB 313, and a map information DB 314. The vehicle management section 301, the viewing request acquisition section 302, the image management section 303, and the instruction generation section 304 are, for example, functional components provided in such a manner that the processor 31 of the server 30 executes the various programs stored in the secondary storage section 33.

The user information DB 311, the vehicle information DB 312, the image information DB 313, and the map information DB 314 are, for example, relational databases constructed in such a manner that a program for a database management system (DBMS) executed by the processor 31 manages data stored in the secondary storage section 33. Note that any of the individual functional components of the server 30, or part of processing by the individual functional components of the server 30, may be executed by another computer connected to the network N1.

The vehicle management section 301 manages various information related to the vehicle 10. For example, the vehicle management section 301 acquires and manages the vehicle information (the radio wave intensity information, the location information, and the orientation information) transmitted from the vehicle 10. The vehicle management section 301 stores the vehicle information in the vehicle information DB 312 in association with the vehicle ID and a time. The vehicle management section 301 manages a status of the vehicle 10. The status is information for determining whether or not the vehicle 10 is in the preparing-for-parking state, and information for determining whether or not the vehicle 10 is in the parked state. For example, when a current location of the vehicle 10 indicates an inside of a parking area, the vehicle management section 301 determines that the vehicle 10 is in the preparing-for-parking state. The vehicle management section 301 may determine whether or not the vehicle 10 is in the preparing-for-parking state, based on map information stored in the map information DB 314, which will be described later, and the location information on the vehicle 10. The vehicle 10 may determine whether or not the vehicle 10 is in the preparing-for-parking state, and the vehicle management section 301 may acquire a result of the determination. The vehicle management section 301 stores the status of the vehicle 10 in the vehicle information DB 312 in association with the vehicle ID and a time. Note that the status of the vehicle 10 may be transmitted from the vehicle 10, for example, together with the vehicle information.

For example, the viewing request acquisition section 302 acquires a viewing request transmitted from the user terminal 20.

For example, the image management section 303 acquires and manages image information transmitted from the vehicle 10. When the image information is received, the image management section 303 stores the image information in the secondary storage section 33 in association with the vehicle ID. The image management section 303 provides the image information, based on a request from the user terminal 20.

For example, the instruction generation section 304 generates an instruction such that the vehicle 10 will be parked at a location where the radio wave intensity becomes not lower than the predetermined intensity, or at a location where the radio wave intensity becomes greater. The instruction includes, for example, information related to a location of the vehicle 10 and an orientation of the vehicle 10. The instruction may also include, for example, an instruction to move the vehicle 10 straight ahead, an instruction to change a moving direction of the vehicle 10, an instruction to stop the vehicle 10, or an instruction to move the vehicle 10 backward. The instruction is generated such as to show a location at which or an orientation in which the radio wave intensity becomes not lower than an intensity at a current location. For example, when the radio wave intensity increases while the vehicle 10 in the preparing-for-parking state is moving straight ahead, it is conceivable that the radio wave intensity further increases as the vehicle further moves straight ahead, and therefore the instruction is generated such as to move the vehicle 10 straight ahead. When the radio wave intensity decreases while the vehicle 10 is moving straight ahead, it is conceivable that the radio wave intensity further decreases as the vehicle further moves straight ahead, and therefore the instruction is generated, for example, such as to move the vehicle 10 in an opposite direction or backward, or to stop the vehicle 10 at a current location. In such manners, the instruction is generated such that when the vehicle is parked, the radio wave intensity will not decrease below at least a current radio wave intensity. The instruction generation section 304 transmits the generated operational instruction to the vehicle 10 via the communication section 34.

The instruction generation section 304 may estimate an increase or a decrease in the radio wave intensity, for example, based on the image information transmitted from the vehicle 10. For example, it is estimated that the radio wave intensity becomes smaller (that is, it is estimated that the radio wave intensity becomes lower than the predetermined intensity) in a vicinity of such a large object that shields radio waves (for example, a building, a signboard, a large sized vehicle, or the like; hereinafter, also referred to as shielding object), and the instruction may be generated such that the vehicle 10 will not be moved closer to the shielding object. When it is likely that the radio wave intensity will decrease due to an effect of a shielding object if the vehicle 10 is moved any further, the instruction may be generated such as to park the vehicle 10 at a current location such that the vehicle 10 will not be moved any further. For example, even when the vehicle 10 is parked at the same location, a shielding object affects the radio wave intensity differently when directions of the vehicle 10 are 180 degrees opposite, in some cases. Accordingly, for example, the instruction may be generated such that the vehicle 10 will point in an orientation insusceptible to the shielding object. For example, the instruction generation section 304 may determine a location at which and a direction in which the vehicle 10 is to be parked, based on a location of a base station, a location of a building or the like, and a location of an antenna included in the communication section 16 of the vehicle 10. For example, the instruction may be generated such as to park the vehicle 10 at a location with no building or the like between the antenna of the communication section 16 and the base station. The instruction generation section 304 may acquire a location of a shielding object on a map, from a location and a direction of the vehicle 10 at a current time point, and a location of the shielding object in an image. For the acquisition, a known technique can be used. The instruction related to a location at which and a direction in which the vehicle 10 is to be parked may be generated based on an increase or a decrease in the radio wave intensity estimated based on the image information, and an increase or a decrease in the radio wave intensity actually measured.

The user information DB 311 is formed in such a manner that user information on a user is stored in the secondary storage section 33, and each user and user information are associated with each other in the user information DB 311.

The user information includes, for example, a user ID, a name, an address, a vehicle ID, and the like associated with the user.

The vehicle information DB 312 is formed in such a manner that the vehicle information is stored in the secondary storage section 33, and a vehicle ID and the vehicle information are associated with each other in the vehicle information DB 312. Here, a structure of the vehicle information stored in the vehicle information DB 312 will be described based on FIG. 6. FIG. 6 illustrates a table structure of the vehicle information. A vehicle information table includes respective fields for vehicle ID, time, radio wave intensity, location, orientation, and status. In the vehicle ID field, identification information for identifying a vehicle 10 is input. In the time field, information related to a time at which the vehicle information is acquired is input. In the radio wave intensity field, radio wave intensity information transmitted by the vehicle 10 is input. In the location field, location information transmitted by the vehicle 10 is input. The location information is information indicating a current location of the vehicle 10. In the orientation field, orientation information transmitted by the vehicle 10 is input. In the status field, information related to a status of the vehicle 10 is input. Note that in FIG. 6, "1" is input in the status field when the vehicle 10 is in the preparing-for-parking state, "2" is input in the status field when the vehicle 10 is in a state (parked state) after completion of parking and before the user gets in the vehicle 10 again, and otherwise, "0" is input in the status field.

Figures 7, 8:
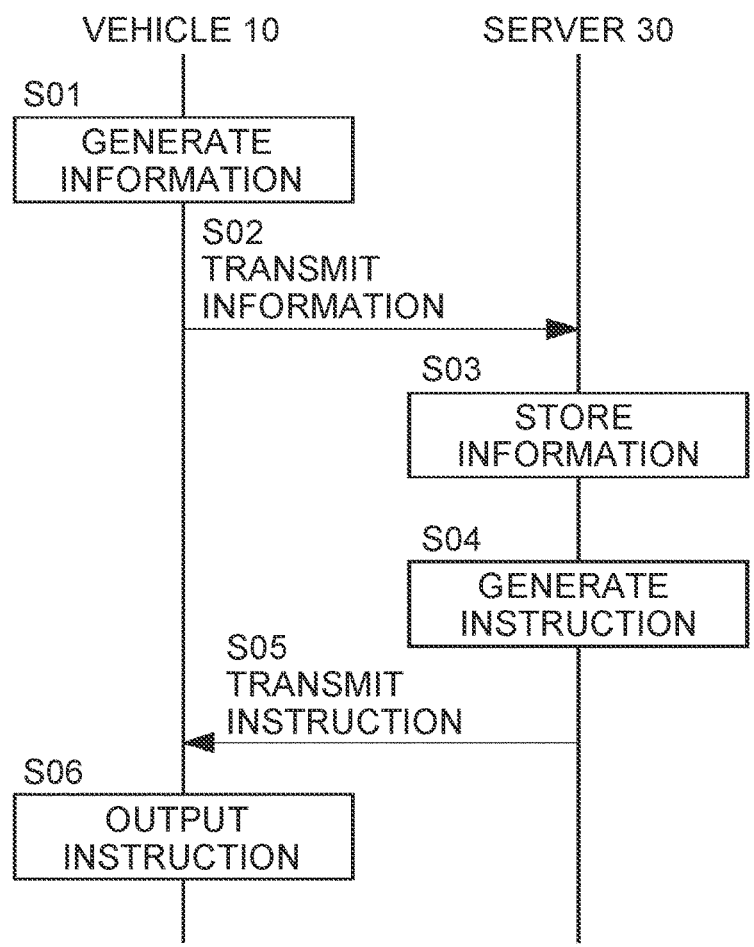
FIG. 7 illustrates a table structure of image information.
FIG. 8 is a sequence diagram of processing in the vehicle surveillance system when the vehicle surveillance system generates an instruction.

The image information DB 313 is formed in such a manner that the image information is stored in the secondary storage section 33, and a vehicle ID for each user and the image information are associated with each other in the image information DB 313. Here, a structure of the image information stored in the image information DB 313 will be described based on FIG. 7. FIG. 7 illustrates a table structure of the image information. An image information table includes respective fields for vehicle ID, time, and image. In the vehicle ID field, information (vehicle ID) for identifying a vehicle 10 is input. In the time field, information related to a time at which the image information is acquired is input. In the image field, information related to a location where an image is stored in the secondary storage section 33 is input. Note that instead of the time fields, time period fields may be included, in each of which a time period during which a moving image is shot (a start time and an end time of a moving image) is stored.

The map information DB 314 stores the map information that includes map data and POI (Point of Interest) information such as a letter or a picture indicating a characteristic of each point on the map data. Note that the map information DB 314 may be provided from another system, for example, a GIS (Geographic Information System) connected to the network N1. The map data may include radio wave intensity information acquired in the past at each location on the map. The past radio wave intensity information may be information obtained by accumulating radio wave intensity information transmitted from vehicles 10, or may be radio wave intensity information acquired on site by a service provider beforehand. The map information DB 314 includes information indicating a parking area.

Processing Flow: Generation of Instruction

Next, operation performed when the vehicle surveillance system 1 generates an instruction will be described. FIG. 8 is a sequence diagram of processing in the vehicle surveillance system 1 when the vehicle surveillance system 1 generates an instruction. Note that in the sequence diagram shown in FIG. 8, a case of one user and one vehicle 10 is supposed.

The vehicle 10 generates radio wave intensity information, location information, orientation information, a status, and image information at each predetermined time interval (processing in S01) and transmits the information to the server 30 (processing in S02). The server 30 having received the information stores the information in the vehicle information DB 312 and the image information DB 313 (processing in S03). When the status of the vehicle 10 indicates the preparing-for-parking state, the server 30 generates an instruction (processing in S04) and transmits the instruction to the vehicle 10 (processing in S05). At the vehicle 10 having received the instruction, information corresponding to the instruction is output to the output section 15 (processing in S06). In other words, a direction in which the vehicle 10 is to be moved, a location at which the vehicle 10 is to be parked, or the like is shown to the user.

Processing Flow: Image Viewing

Figure 9:
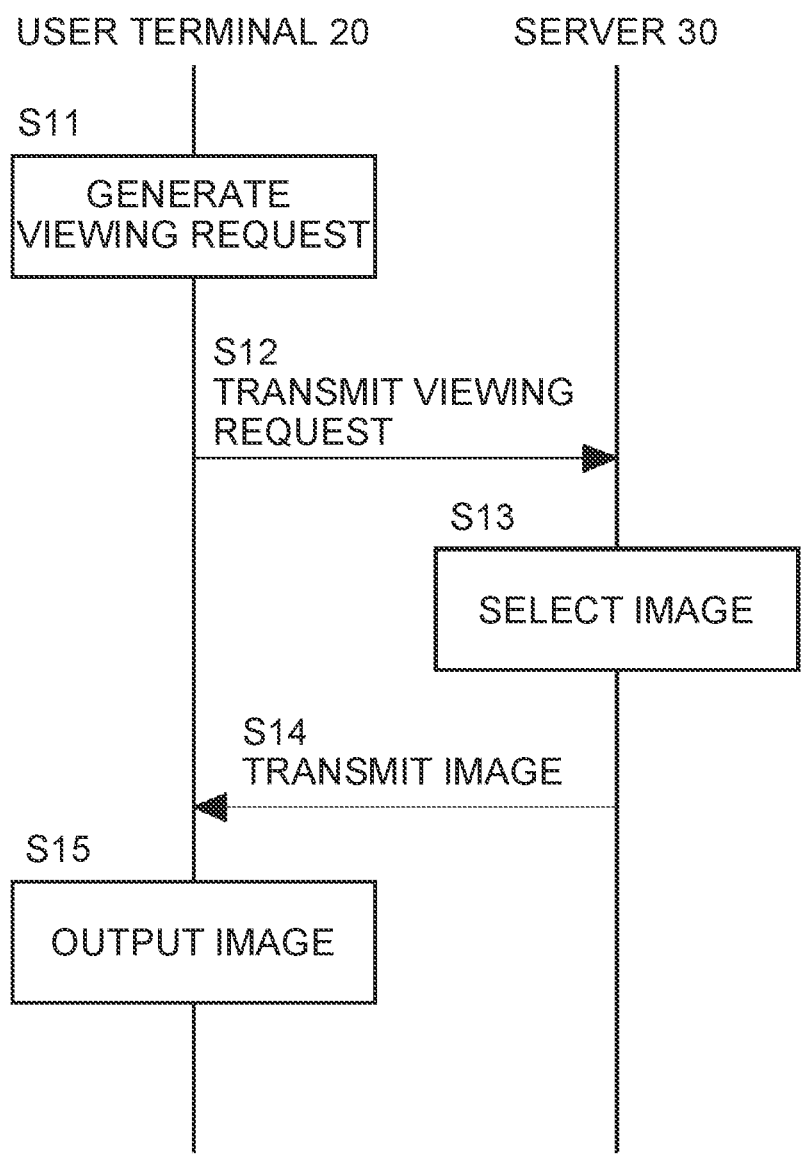
FIG. 9 is a sequence diagram of processing in the vehicle surveillance system when the vehicle surveillance system outputs an image.

Next, operation performed when the vehicle surveillance system 1 provides an image to the user will be described. FIG. 9 is a sequence diagram of processing in the vehicle surveillance system 1 when the vehicle surveillance system 1 outputs an image.

When the user makes an input to the effect that the user wants to view an image shot at the vehicle 10 into the user terminal 20, the user terminal 20 generates a viewing request (processing in S11). The viewing request may include information related to a time. Note that the user can also specify a past time. The viewing request is transmitted from the user terminal 20 to the server 30 (processing in S12). When the viewing request is received from the user terminal 20, the server 30 selects an image to be viewed by the user (processing in S13). The server 30 selects from the image information DB 313 an image associated with a vehicle 10 corresponding to a user ID and a time included in the viewing request. When selection of the image is completed, the image information is transmitted to the user terminal 20 (processing in S14), and at the user terminal 20, the image is output to the output section 25 (processing in S15).

Processing Flow: Server

Figure 10:
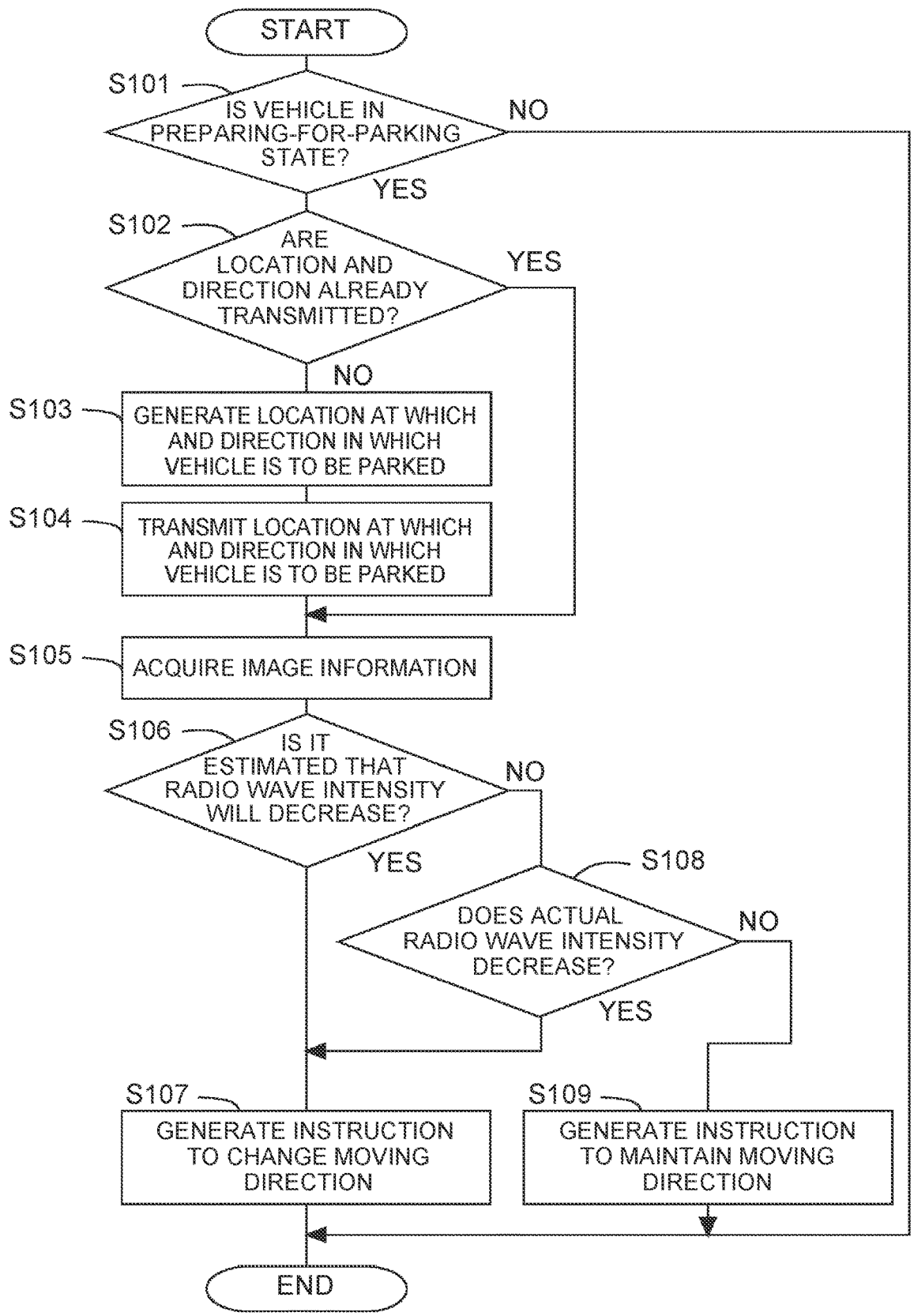
FIG. 10 is a flowchart showing an example of processing in the server when the vehicle surveillance system generates an instruction.

Next, processing in the server 30 according to the first embodiment will be described with reference to FIG. 10. FIG. 10 is a flowchart showing an example of the processing in the server 30 when the vehicle surveillance system 1 generates an instruction. The processing shown in FIG. 10 is performed by the processor 31 at each predetermined time interval (for example, at a constant cycle). Note that the flowchart is performed for each vehicle 10. For example, the processing shown in FIG. 10 is performed at S04 in FIG. 8.

In step S101, the vehicle management section 301 determines whether or not the vehicle 10 is in the preparing-for-parking state. The vehicle management section 301 accesses the vehicle information DB 312 and determines whether or not a status field for a latest record corresponding to the vehicle 10 contains "1". The routine advances to step S102 when positive determination is made in step S101, and the routine is terminated when negative determination is made. Generation of information related to a parking form is triggered by the positive determination in step S101.

In step S102, the instruction generation section 304 determines whether or not information related to a location at which and a direction in which the vehicle 10 is to be parked is already transmitted. In the step, it is determined whether or not processing in step S103 and step S104, which will be described below, is completed. The routine advances to step S105 when positive determination is made in step S102, and the routine advances to step S103 when negative determination is made.

In step S103, the instruction generation section 304 accesses the map information DB 314 and generates information related to a location at which and a direction in which the radio wave intensity becomes not lower than the predetermined intensity in a parking area. At the time, the location and the direction are generated based on the information stored in the map information DB 314. In step S104, the instruction generation section 304 transmits the information generated in step S103 to the vehicle 10. In such a manner, first, the location and the direction based on the map information DB 314 are shown to the user. Note that the processing in step S102 to step S104 can be omitted.

In step S105, the instruction generation section 304 accesses the image information DB 313 and acquires a latest image associated with the vehicle 10. In step S106, the instruction generation section 304 estimates, based on the latest image, whether or not the radio wave intensity will decrease. In the embodiment, it is assumed that the radio wave intensity is lower than the predetermined value when the radio wave intensity decreases below a value at a current time point. For example, when a shielding object exists near the location generated in step S104, it is determined that the radio wave intensity will decrease. The routine advances to step S107 when positive determination is made in step S106, and the routine advances to step S108 when negative determination is made.

In step S107, the instruction generation section 304 generates an instruction such as to change a moving direction of the vehicle 10 from a current moving direction. By changing the moving direction, the radio wave intensity can be increased. Note that in step S107, instead of generating the instruction such as to change the moving direction, an instruction may be generated such as to park the vehicle 10 at a current location, or an instruction may be generated such as to move the vehicle 10 backward. By parking the vehicle at the current location, a decrease in the radio wave intensity due to an effect of a shielding object can be restrained. By moving the vehicle backward, the radio wave intensity can be increased.

In step S108, the instruction generation section 304 determines whether or not the actual radio wave intensity decreases. The instruction generation section 304 accesses the vehicle information DB 312 and determines whether or not the radio wave intensity decreases. In other words, it is determined that the radio wave intensity decreases when a radio wave intensity corresponding to a latest time is smaller than a radio wave intensity corresponding to a past time (for example, a time in a previous routine, or a time of a predetermined time period ago). When the actual radio wave intensity decreases even if a shielding object cannot be confirmed, the routine advances to step S107, and changing of the moving direction or the like is performed. In other words, the routine advances to step S107 when positive determination is made in step S108, and the routine advances to step S109 when negative determination is made.

In step S109, the instruction generation section 304 generates an instruction such as to maintain the current moving direction of the vehicle 10. By maintaining the current moving direction, the radio wave intensity can be increased. The instruction generation section 304 transmits the instruction generated in step S107 or step S109 to the vehicle 10. Note that the processing in step S108 can be omitted. In such a case, the routine advances to step S109 when negative determination is made in step S106. The processing in step S106 can be omitted. In such a case, the routine advances to step S108 after step S105.

Processing Flow: Server

Figure 11:
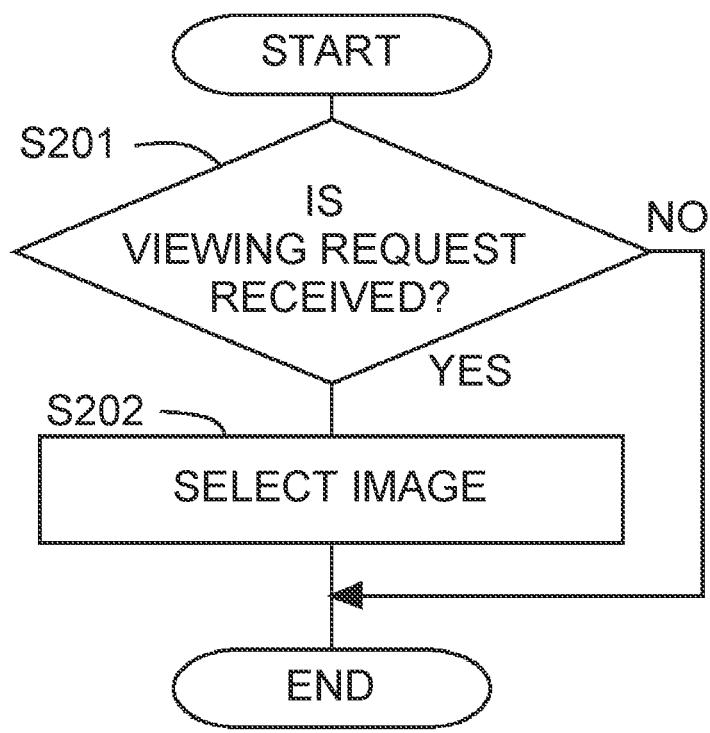
FIG. 11 is a flowchart showing an example of processing when the vehicle surveillance system outputs image information to the user terminal.

Next, processing in the server 30 according to the first embodiment will be described with reference to FIG. 11. FIG. 11 is a flowchart showing an example of processing when the vehicle surveillance system 1 outputs image information to the user terminal 20. The processing shown in FIG. 11 is performed by the processor 31 at each predetermined time interval (for example, at a constant cycle). Note that the flowchart is performed for each user terminal 20. For example, the processing shown in FIG. 11 is performed at S13 in FIG. 9.

In step S201, the viewing request acquisition section 302 determines whether or not a viewing request is received. The routine advances to step S202 when positive determination is made in step S201, and the routine is terminated when negative determination is made. In step S202, the image management section 303 selects from the image information DB 313 an image associated with a vehicle 10 corresponding to the viewing request. Note that since the viewing request is associated with a user ID, an image associated with a vehicle ID corresponding to the user ID is selected. When a plurality of vehicles 10 correspond to the user ID, the viewing request may include a vehicle ID. When the viewing request includes information related to a time, the image management section 303 selects an image shot at the time specified by the user from the image information DB 313. Thereafter, the image management section 303 transmits the selected image to the user terminal 20.

Processing Flow: User Terminal

Figure 12:
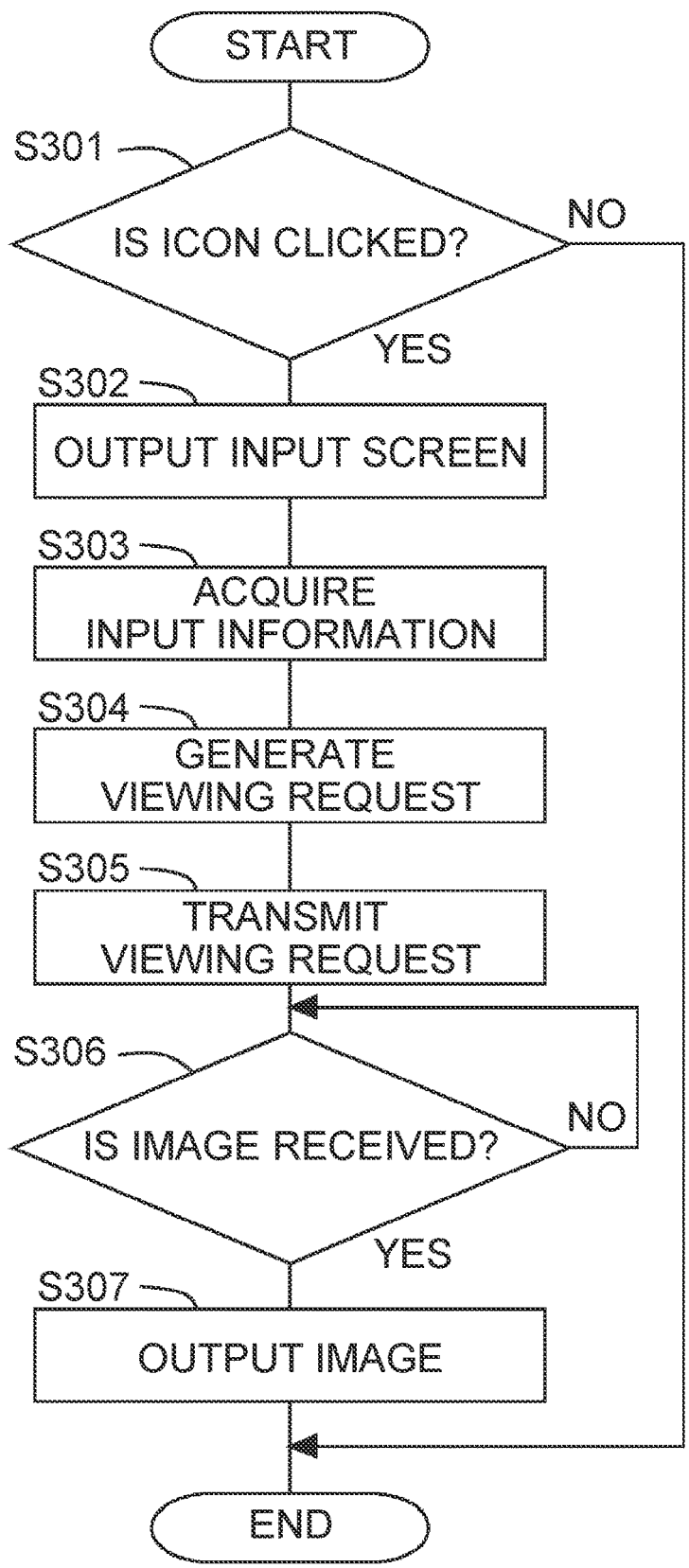
FIG. 12 is a flowchart showing a processing flow in the user terminal.

Next, processing in the user terminal 20 will be described with reference to FIG. 12. FIG. 12 is a flowchart showing a processing flow in the user terminal 20. The processing shown in FIG. 12 is performed by the processor 21 at each predetermined time interval (for example, at a constant cycle). For example, the processing shown in FIG. 12 corresponds to the processing performed by the user terminal 20 in FIG. 9.

In step S301, the viewing request transmission section 201 determines whether or not the user clicks on an icon displayed in a screen of the user terminal 20. The icon is an icon for activating a program for image viewing. In other words, in step S301, it is determined whether or not the user requests an image at the vehicle 10. The routine advances to step S302 when positive determination is made in step S301, and the routine is terminated when negative determination is made. In step S302, the viewing request transmission section 201 causes an input screen to be displayed. The input screen is, for example, a screen for allowing a user ID, a password, and a time at which an image is shot to be input.

In step S303, the viewing request transmission section 201 acquires the information input by the user. In step S304, the viewing request transmission section 201 generates a viewing request, based on the information input by the user. In step S305, the viewing request transmission section 201 transmits the viewing request to the server 30.

In step S306, the image reproduction section 202 determines whether or not the image is received from the server 30. The routine advances to step S307 when positive determination is made in step S306, and step S306 is performed again when negative determination is made. In step S307, the image reproduction section 202 outputs the image to the output section 25. In other words, the image is displayed in the screen of the user terminal 20.

Processing Flow: Vehicle

Next, processing in the vehicle 10 will be described with reference to FIG. 13. FIG. 13 is a flowchart showing a processing flow in the vehicle 10. The processing shown in FIG. 13 is performed by the processor 11 at each predetermined time interval (for example, at a constant cycle). For example, the processing shown in FIG. 13 corresponds to the processing performed by the vehicle 10 in FIG. 8.

In step S401, the vehicle information transmission section 103 generates vehicle information. In step S402, the vehicle information transmission section 103 transmits the vehicle information to the server 30. In step S403, the navigation section 104 determines whether or not an instruction is received from the server 30. The routine advances to step S404 when positive determination is made in step S403, and the routine is terminated when negative determination is made. In step S404, the navigation section 104 causes the output section 15 to output guiding information according to the instruction.

Next, processing in the vehicle 10 will be described with reference to FIG. 14. FIG. 14 is a flowchart showing a processing flow of transmitting an image at the vehicle 10. The processing shown in FIG. 14 is performed by the processor 11 at each predetermined time interval (for example, at a constant cycle). The image transmitted through the routine is an image for determination as to the radio wave intensity, or an image viewable by a user.

In step S501, the shooting section 101 determines whether or not the vehicle 10 is in the preparing-for-parking state or the parked state. The routine advances to step S502 when positive determination is made in step S501, and the routine is terminated when negative determination is made.

In step S502, the shooting section 101 determines whether or not a state of charge (SOC) of a battery of the vehicle 10 is equal to or larger than a predetermined value. The predetermined value is a state of charge that enables the vehicle 10 to travel. For example, when the vehicle 10 is an electric vehicle, the predetermined value is a state of charge that enables the vehicle 10 to travel a predetermined distance (for example, a distance up to a destination or home). When the vehicle 10 is a vehicle using an internal combustion engine as a driving source, the predetermined value is a state of charge required to start the internal combustion engine. The SOC is acquired by the shooting section 101. When the SOC is smaller than the predetermined value, shooting is not performed because the vehicle 10 may become unable to travel due to performing shooting. The routine advances to step S503 when positive determination is made in step S502, and the routine is terminated when negative determination is made. Note that the processing in step S502 can be omitted.

In step S503, the shooting section 101 starts shooting by using the camera 19. When shooting is already started, the shooting is continued. In step S504, the vehicle information transmission section 103 transmits image information. Note that image information may be transmitted at each predetermined time interval, or may be transmitted together with vehicle information. The routine is performed until a driver of the vehicle 10 gets in the vehicle 10. For example, in a case of the vehicle 10 adopting a smart key system, it can be determined, based on intensity of a signal from a key, whether or not the driver gets in the vehicle 10. When the driver gets in the vehicle 10, negative determination is made in step S501.

As described above, according to the embodiment, an image shot at the vehicle 10 can be quickly transmitted to the server 30 because the vehicle 10 can be parked at a location or in a direction where the radio wave intensity becomes not lower than the predetermined intensity. Accordingly, surveillance of the vehicle 10 and surroundings of the vehicle 10 can be performed more reliably.

Other Embodiments

The embodiment is only an example, and the disclosure can be worked with changes appropriately made without departing from the scope of the disclosure. Although the server 30 includes the vehicle management section 301, the viewing request acquisition section 302, the image management section 303, and the instruction generation section 304 in the embodiment, one or some, or all, of such functional components may be included in the vehicle 10 or the user terminal 20. For example, the instruction generation section 304 may be included in the vehicle 10.

For example, at least part of the control section of the disclosure may be the processor 11 of the vehicle 10 or the processor 21 of the user terminal 20. For example, when the user is on board the vehicle 10, a current location of the user terminal 20 can be thought to be identical to a current location of the vehicle 10, and therefore the user terminal 20 may acquire a radio wave intensity in mobile communication. The user terminal 20 may transmit the radio wave intensity acquired by the user terminal 20 to the server 30. The server 30 may transmit a generated instruction to the user terminal 20, and the user terminal 20 may show a location at which or a direction in which the vehicle 10 is to be parked.

Although the user drives the vehicle 10 in the embodiment, the vehicle 10 may be an autonomous vehicle instead. For example, in step S107 and step S109, the server 30 may generate an operational instruction for the vehicle 10. The server 30 may transmit the operational instruction to the vehicle 10, and the vehicle 10 having received the operational instruction may perform self-driving.

The processing and the means described in the disclosure can be freely combined to be executed to an extent that no technical inconsistencies arise.

The processing described as being performed by a single apparatus may be performed by a plurality of apparatuses in a divided manner. The processing described as being performed by different apparatuses may be performed by a single apparatus. In a computer system, it can be flexibly changed what hardware configuration (server configuration) is used to implement each function.

The disclosure can also be implemented in such a manner that a computer program implementing the functions described in the embodiment is provided to a computer and one or more processors included in the computer read and execute the program. Such a computer program may be provided to the computer by using a non-transitory computer-readable storage medium that can connect to a system bus of the computer, or may be provided to the computer via a network. Examples of the non-transitory computer-readable storage medium include any types of disks, such as magnetic disks/discs (floppy (registered trademark) disk, hard disk drive (HDD), and the like) and optical discs (CD-ROM, DVD disc, Blu-ray Disc, and the like), a read only memory (ROM), a random access memory (RAM), an EPROM, an EEPROM, a magnetic card, a flash memory, an optical card, and any types of media suitable to store electronic instructions.

What is claimed is:

1. A vehicle surveillance system in which when a vehicle including a communicator that performs transmission-reception of radio communication is parked, information related to surveillance of the vehicle acquired at the vehicle is transmitted from the communicator through the radio communication, the vehicle surveillance system comprising a processor programmed to: acquire information related to radio wave intensity received by the communicator; when the vehicle is intended to be parked, generate information indicating a parking form that makes the radio wave intensity not lower than a predetermined intensity, based on the information related to the radio wave intensity received by the communicator; and when the radio wave intensity received by the communicator shows a tendency to decrease while the vehicle is moving in a predetermined area where the vehicle is allowed to be parked, generate the information indicating the parking form that makes the radio wave intensity not lower than the predetermined intensity in a different direction from a moving direction of the vehicle.

2. The vehicle surveillance system according to claim 1, wherein the processor is programmed to generate the information indicating the parking form that makes the radio wave intensity not lower than the predetermined intensity, based on image data shot by a camera included in the vehicle.

3. The vehicle surveillance system according to claim 2, further comprising a storage that stores the information indicating the parking form that makes the radio wave intensity not lower than the predetermined intensity in a predetermined area where the vehicle is allowed to be parked,
   wherein the processor is programmed to generate the information indicating the parking form that makes the radio wave intensity not lower than the predetermined intensity, based on the image data shot by the camera and the information stored in the storage.

4. The vehicle surveillance system according to claim 1, wherein the processor is programmed to generate the information indicating the parking form that makes the radio wave intensity not lower than the predetermined intensity, as information that a navigation system included in the vehicle provides to a user.

5. The vehicle surveillance system according to claim 1, wherein the processor is programmed to generate the information indicating the parking form that makes the radio wave intensity not lower than the predetermined intensity, by being triggered by a current location of the vehicle entering an area related to a parking area.

6. A vehicle surveillance method in which when a vehicle including a communicator that performs transmission-reception of radio communication is parked, information related to surveillance of the vehicle acquired at the vehicle is transmitted from the communicator through the radio communication, the vehicle surveillance method comprising: by a computer, acquiring information related to radio wave intensity received by the communicator; when the vehicle is intended to be parked, generating information indicating a parking form that makes the radio wave intensity not lower than a predetermined intensity, based on the information related to the radio wave intensity received by the communicator; and when the radio wave intensity received by the communicator shows a tendency to decrease while the vehicle is moving in a predetermined area where the vehicle is allowed to be parked, generate the information indicating the parking form that makes the radio wave intensity not lower than the redetermined intensity in a different direction from a moving direction of the vehicle.

7. The vehicle surveillance system according to claim 1, wherein the parking form is a location at which the vehicle is to be parked or a direction in which the vehicle is to be parked.

8. The vehicle surveillance system according to claim 1, wherein when a plurality of parking stalls exist, the information indicating the parking form is generated such that which stall the vehicle is to be parked is able to be determined.

9. The vehicle surveillance system according to claim 1, wherein when a possibility exists that the radio wave intensity varies depending on a direction of the vehicle even in a same parking stall, the information indicating the parking form is generated such that whether the vehicle is to be moved forward and parked, or is to be moved backward and parked is able to be determined.

10. The vehicle surveillance system according to claim 1, wherein when a possibility exists that the radio wave intensity varies depending on a location in a parking stall even in a same stall, the information indicating the parking form is generated such that which location in the parking stall the vehicle is to be parked is able to be determined.

* * * * *